United States Patent [19]

Schrenk

[11] Patent Number: 4,572,946

[45] Date of Patent: Feb. 25, 1986

[54] CREDIT CARD CIRCUIT ARRANGEMENT WITH A MEMORY AND AN ACCESS CONTROL UNIT

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 609,783

[22] Filed: May 14, 1984

[30] Foreign Application Priority Data

May 18, 1983 [DE] Fed. Rep. of Germany ....... 3318101

[51] Int. Cl.⁴ .............................................. G06K 5/00
[52] U.S. Cl. .................. 235/380; 235/379; 235/436; 235/492
[58] Field of Search ............... 235/379, 380, 382, 436, 235/492

[56] References Cited

U.S. PATENT DOCUMENTS 4,001,550  1/1977  Schatz .................................. 235/379
4,408,119  10/1983  Decavele ......................... 235/380 X
4,439,670  3/1984  Basset et al. ..................... 235/380 X

FOREIGN PATENT DOCUMENTS 2401459  3/1979  France .
2460506  1/1981  France .
2471000  6/1981  France .

Primary Examiner—David L. Trafton
Attorney, Agent, or Firm—Herbert L. Lerner; Laurence A. Greenberg

[57] ABSTRACT

A monolithically integrable circuit arrangement includes a memory with non-volatile electrically writable and erasable memory cells, an addressing circuit for reading, writing and erasing the memory, and a control unit which makes the access to the memory dependent on a validation operation with data comparison between stored reference data and code data entered from the outside, wherein the control unit, consisting of at least one comparator (57) for delivering a comparison signal (DOK), of a write control unit (3) for alternatively writing on a first or second operating data region which can be selected via an addressing unit depending on the comparison signal in such a manner that in the event of equality of the data, the first, and in the event of inequality of the data, the second operating data region is addressed, and having an erase control unit (9) for erasing the operating data regions, depending on the preceding execution of a write operation in the first operating data region.

11 Claims, 4 Drawing Figures

CREDIT CARD CIRCUIT ARRANGEMENT WITH A MEMORY AND AN ACCESS CONTROL UNIT

BACKGROUND AND PRIOR ART

The invention relates to a monolithically integrable circuit arrangement consisting of a memory with non-volatile electrically writable and erasable memory cells, an addressing circuit for reading, writing and erasing the memory, and of a control unit which makes access to the memory dependent on a release operation with data comparison between stored reference data and code data entered from the outside.

For cashless payment for merchandise or settlement for services rendered and the like, data-controlled payment systems are known, which are described, for instance, in the journal "Betriebspraxis", B.BL.2/1982, page 48, by Dr. R. Nowak and W. Roeder under the title "Die Chip-Karte—naechste Generation der Automatenkarte" (The chip card, the next generation of the card for automated equipment). The cards used there carry as an essential element a non-volatile electric data memory which can be accessed via electric contacts on the card surface. A computing unit accesses for each use, via a card reader, the memory content, which may be changed in the process.

Such cards are used in security and access systems, in accounting or recording systems and in debit or credit systems. In order to assure wide distribution and frequent use of the cards, there are operators of such systems who issue a large number of cards and offer a wide-spread network of readers and computing equipments. In order to make misuse of the data impossible, the card systems must meet stringent security requirements. Especially the bearer cards, the distribution of which cannot always be controlled, must be protected against use by unauthorized persons.

This can be achieved by a validation operation ("release operation"), in which a data comparison between a code word entered by an operator or encoded by a computer with a stored reference word, is carried out and access is validated ("released") or blocked, depending on the result of the comparison. By lengthening the code word, it can practically be precluded that a cheater guesses the code used accidentally or by systematic trial. Also a personal identification code, which may include only a few characters, can be extended via a computer to a size which no longer can be decoded.

It is known from French Pat. No. 24 01 459 to equip a microprocessor system with a data memory which is divided into three memory regions with different access conditions. A first, secret region is not accessible externally in any case. Two further regions can be written-on or read-out only from the outside.

In French Pat. No. 24 71 000 an integrated circuit protected against unauthorized access for use on a credit card is described. The operation of the associated control unit is based on the fact that of a predetermined number of attempts to enter a code word, all valid and all invalid entries are counted in the order of their occurrence. If a predetermined number of unsuccessful attempts follow each other immediately, the circuit is made inoperative.

There is further known from French Pat. No. 24 60 506 a control unit of this type, in which the results of the comparison (valid or invalid) of the stored code word and the entered code words are stored symmetrically to each other in two separate memories.

SUMMARY

It is an object of the invention to describe a circuit arrangement of the type mentioned above, by which a validation operation can be executed which prevents unauthorized access to the memory with high probability. This problem is solved by a control unit consisting of at least one comparator for furnishing a reference code; of a write-control unit for alternative writing on a first or second operating data region which can be selected via an addressing logic, depending on the reference code in such a way that for equality of the data, the first operating data region is addressed and for inequality of the data, the second operating data region is addressed; and of an erase control unit for erasing both operating regions, depending on the preceding execution of a writing operation in the first operating data region.

Every validation ("release") operation is recorded before the validation is achieved in a non-volatile manner by an internal logic unit in the card in conjunction with an external control. Before access to the secured memory addresses is possible, at least one further memory cell must have been occupied and erased again by a validation marker after all comparison operations have been carried out. During the writing process, the user does not know whether a validation or an error marker is stored in the card in a non-volatile manner. After each unsuccessful attempt, an additional error marker remains set. Erasing the markers is possible only if the release marker had been set. After a given number of error markers, are set, the memory can no longer be validated by further validation attempts.

In addition to the construction from simple function groups, the invention has the advantage that data not permitted for use are recognized. It provides protection against unauthorized data changes and unauthorized duplication of cards ready for operation.

Also knowledge of the electrical specifications or the internal structure of the control unit does not lead to the disclosure of data which are necessary for the unsuccessful execution of a validation operation. Systematic examination for decoding the secret code data are prevented by limiting the number of permissible attempts. The validation signal generated after a successful validation operation cannot be taken off at the interfaces between the card and the computer. The success or failure of a validation operation can be detected only after the completion of all comparison operations as well as of the write and erase operations, from the possibility of the memory access.

High protection against fraudulent manipulations is further provided by the feature that the addresses of the code word region cannot be read out under any circumstances, also not after a validation of the memory access. The content of the code word region can therefore be checked only via the validation operation itself, i.e., with prior knowledge of the stored data.

Further embodiments of the invention will be seen from the claims. Although the invention is illustrated and described herein as embodied in a credit card circuit arrangement with a memory and an access control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompaying drawings.

BRIEF DESCRIPTION OF THE DRAWINGS

FIG. 1 shows the circuit arrangement II described in detail in FIGS. 2, 3 and 4 in functional connection with other functional units. The circuit II is embedded in a bearer card 16. By insertion into a card receiver of a card reader 12 an exchange of data can be brought about via a contact device 14 on data input and data output lines DE, DA with a computer 13. Such bearer cards 16 can be used, for instance, as credit or debit cards. Card readers 12 are used, for instance, as automatic tellers. In addition, such circuits II are suitable also without card-shaped carrier medium in limited-access installations.

Unlimited data exchange, for instance, for issuing money, takes place only if a validation signal has been generated by the circuit arrangement II. This condition prevails after a successful validation operation. To the extent that it is necessary for the use of the card, the user enters one or several individual code words into the computer 13 via a data input unit 15 for passing them on to circuit II. During the validation operation, the data exchange is limited to the extent that exclusively only the operations necessary for checking can be executed. Among them is the delivery of control and address codes via lines ST, A to the circuit arrangement II.

In connection with the description of the following figures, a signal is considered operative if it occupies, of the two logic levels 0 and 1, the higher-valued level 1.

Figure 1:
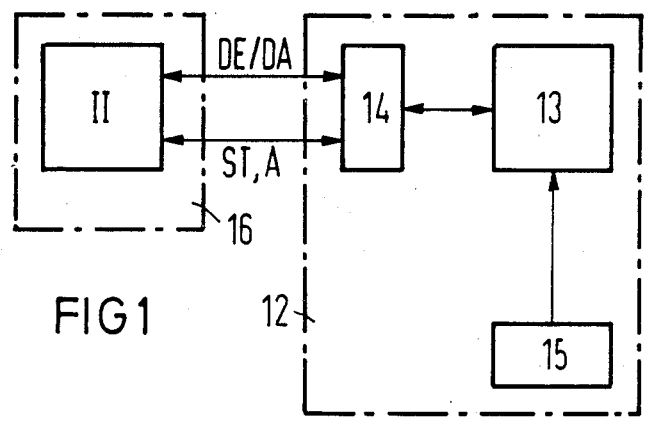
FIG. 1 shows schematically a system for exchanging data between a bearer card and a computer.
Figure 2:
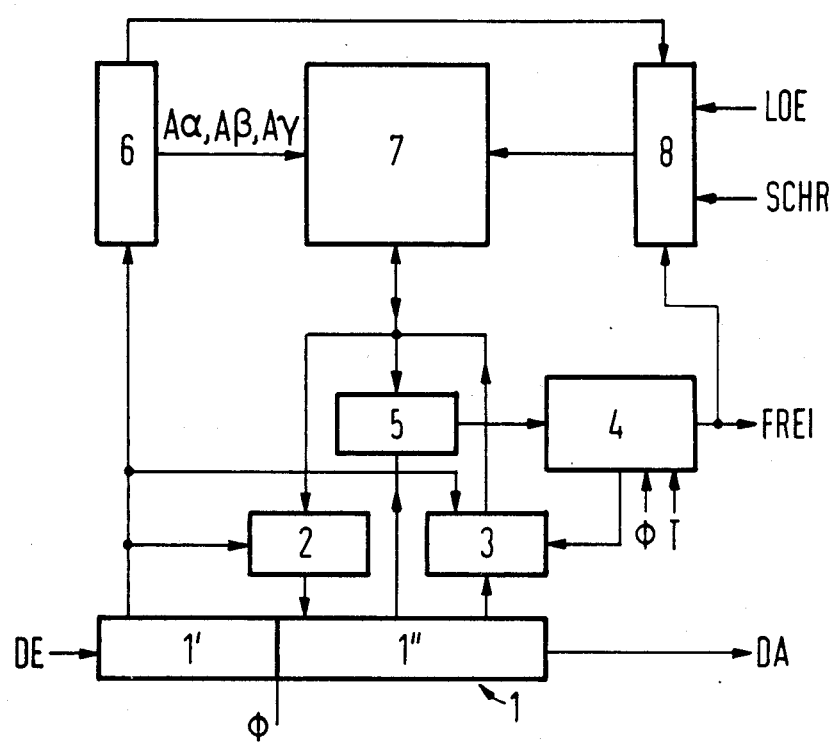
FIG. 2 is a block diagram of a circuit with a memory and an access control unit.

The block diagram in FIG. 2 shows the functional units of a monolithically integrated circuit for processing binary-coded data. It consists of a shift register 1 which is composed of an address register 1' and a data register 1''. The memory area of a non-volatile electrically erasable programmable memory 7 (EROM) is divided into a user memory and a code and operating data memory. of which the address regions are determined by an address decoder 6 via address lines $A\alpha$, $A\beta$, $A\gamma$.

Read-write and erase controls 2, 3 control the access to the memory 7, depending on the address regions. Erase and write signals LOE, SCHR get on the control lines of the memory 7 via a steering control 8.

Figure 3:
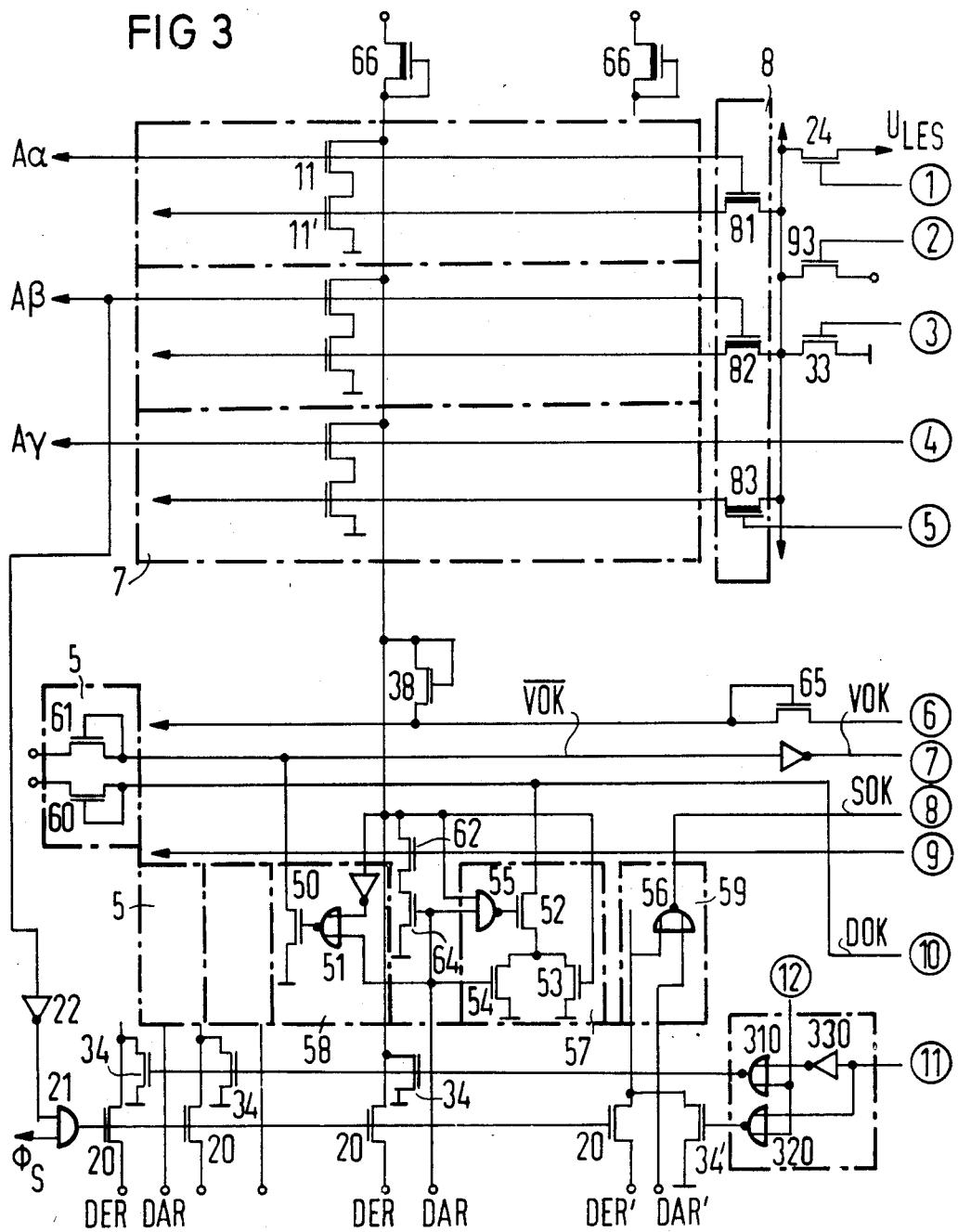
FIGS. 3 and 4 together show details of the circuit according to FIG. 2 by way of example.

In a data comparator unit 5, the reference data stored in the code data and the operating data region of the EROM 7 are compared with the data entered into the data register 1''. The data comparison logic of the comparator 5 generates output signals which are brought to a cycle control 4 depending on the result of the comparison and depending on various comparison operations to be executed in successive time intervals. As seen in FIG. 3, it comprises a comparator core 57 and two state-change indicators 58 and 59 having the following purposes: First, it compares a code word from the data register 1'' for complete agreement with a reference word from the code data memory 7. This is followed by checking part of the operating data memory (a second operating data area of the EROM 7), which determines whether, in the course of the comparison of one or more code data, the previously erased operating memory was written-in by one or more error markers, or whether a marker for error-free test was written into a further region of the operating data memory (a first operating data area of EROM 7). Optionally, these state changes may be indicated by a second or first state change signal VOK, SOK, respectively. The second operating data region containing the error markers is in the following called the error indicating register. The first operating data region for containing the marker for an error-free check is called the validation indicating register.

The cycle control 4 determines the lapse in time of the read-write and the erase operations, taking into account the output signals generated by the data comparison logic of comparator 5. It determines that after a read operation or a data comparison at least one memory cell in the operating data memory is written over and is erased again before the validation signal is generated. The time sections, within which the operations take place, are separated by the four clock signals $T=T1$, T2, T3, T4.

A data word to be entered into the shift register 1, is written at a shift register clock time $\phi$ via input data lines DE and a data word to be outputted is read out via data output lines DA.

The three address regions of the memory 7 are provided with different access properties by the read-write and erase controls 2 and 3, respectively. Depending on the application, reading-out the data, erasing or writing of the user region of the EROM 7 is possible only if a validation signal FREI is present. While reading-out of the two operating data regions is possible without constraints, reading-out of the code data region is not possible under any circumstances because of a read block.

As is shown in FIG. 3, the memory 7 shown in dash-dot lines consists of storage cells ordered in rows and columns, each with a selector MOSFET 11 and a storage MOSFET 11'. All control inputs of the selector MOSFETs 11 of a row are connected to the address decoder 6 (FIG. 2) via one of the address lines $A\alpha$, $A\beta$, $A\gamma$. The storage MOSFETs 11' can be addressed by the row control 8 via program lines. The column lines for writing and reading-out of the storage cells are connected to a low reference signal via the series-connected controlled paths of the MOSFETs 11 and the programming MOSFETs 11'. Such a memory is known from the journal "Electronics", Feb. 28, 1980, pages 113 ff.

To clear the storage cell, the signal level of a programming row is set to a high reference potential and the corresponding column line to the low reference potential. Writing into a storage cell is accomplished by applying the low reference potential to the program row and by occupying the column lines by the signal levels corresponding to the data pattern. The level converters required for addressing the memory 7 are not shown in the figure in order to simplify the figure. For this reason, only one row with several memory cells, not specifically designated, are furthermore reproduced for each of the three memory regions. In the byte-organized storage of data, a row consists of 8 storage cells, for instance. The user memory is determined by the address line $A\alpha$. The address lines $A\beta$ belong to the code data region, and the address lines Aγ address the two operating data regions.

The data comparison unit 5 is connected in parallel to the memory 7 via the column lines. With each column line is associated with respect to the data register 1" a data input line DER and a data output line DAR for transmitting a bit each.

The data comparison logic 5 has between each data input line DER and the respectively associated data output lines DAR a comparator 57 consisting of MOS-FETs 52, 53, 54 and a NAND gate 55. The outputs of all comparators are connected jointly to a MOSFET 60 serving as a load element and together with the latter form a NOR gate. At the common junction point of the comparators, a reference signal DOK can be taken off if the respective signal levels on the line pairs DER and DAR are equal. All columns which are utilized for the bit-wise comparison of the code data with the reference data are provided with such comparators 5.

Next thereto are provided, parallel to the comparators, a first state change indicator 59 consisting of a NOR gate 56 and a second state change indicator 58, each consisting of a NOR gate 51 for addressing a MOSFET 50.

The first state change indicator 59 is connected to the data input and data output lines DER' and DAR' leading to the first operating data region (validation memory).

The second state change indicators 58 are assigned to the second operating data area (error indicators). The outputs of all second state change indicators 58 are jointly connected to the control input of a further MOSFET 61 serving as a load element which, together with all the second state change indicators 58, form a NOR gate. At the common junction point of all second state change indicators 58 a second state change signal VOK is provided through an inverter if at least in one column the data input signal DER, provided via an inverter, and the data output signal DAR simultaneously assume the level zero.

This condition is met if at least in one associated memory cell of the second operating data area the erase level (logic level 1) has not been changed and the content of the data register 1" has the logic value zero at this time. The signal VOK therefore indicates for the error indication memory whether a still erased memory cell is present in at least one column line which was selected by the logic value zero on the data output line DAR. In addition, the state change signal VOK indicates by the logic level 0 if the second operating data area is completely written.

As will be described in a later section, control information with the logic level 0 to be entered by the computer 13 is written into the data register 1" in its memory cells, if the comparators 5 do not determine agreement between reference data and the code word. Therefore, the second operating data area has the function of an error counter for unsuccessful validation operations.

The first state change indicator 59 is connected between the data input lines DER' and DAR' assigned to the first operating data area ("region"). At its output, the first state change signal SOK can be taken off. It indicates whether, (assuming the logic level 0), writing with the logic level 0 took place in the first operating data region on the data output line DAR as a write operation. In order that the first operating data region can be written into, the signal level on DAR' must always be at the logic level 0 after the control word was entered into the register 1, and therefore, must meet the write conditions.

The comparator 57 consists of the NAND gate 55 and the MOSFETs 52, 53, 54. The NAND gate 55 is connected on the input side to a column line and the data output line DAR. If the logic levels of both lines are 0, then the MOSFETs 53 and 54 are blocked and the signal DOK assumes the logic value 1. If on the other hand the logic values of the column line and the data output line DAR are "1", then the MOSFET 52 is blocked, while the signal DOK likewise assumes the logic value 1. If this agreement does not pertain with respect to a single column, the signal DOK is nulled to the logic value 0 by the MOSFETs 52, 53 or 52, 54, respectively.

In every second state change indicator 58, the output signal is pulled down to the logic value 0 via the controlled path of the MOSFET 50 only if the signal on at least one data output line DAR and the inverted signal on the corresponding data input line DER assume the logic value 0. For generating the signal VOK, at least one memory cell with the erase level logic 1 in the release indicating register must coincide with a write request of the logic value 0 on the data output line DAR. If this condition is not met, the write process cannot be executed and therefore, the validation operation cannot be completed.

The addressing logic consists of two NOR gates 310, 320 and an inverter 330. It has the purpose to select in a writing operation alternatively one of the two operating data regions, depending on the comparison signal DOK.

To this end, the one NOR gate 320 is connected on the input side to a first validation signal F1 derived from the validation signal DOK, and the second NOR gate 310 via the inverter 330 also to the first validation signal F1. In addition, the two NOR gates 310, 320 are connected via circled line connection 12 to the write control 3 reproduced in detail in FIG. 3.

Figure 4:
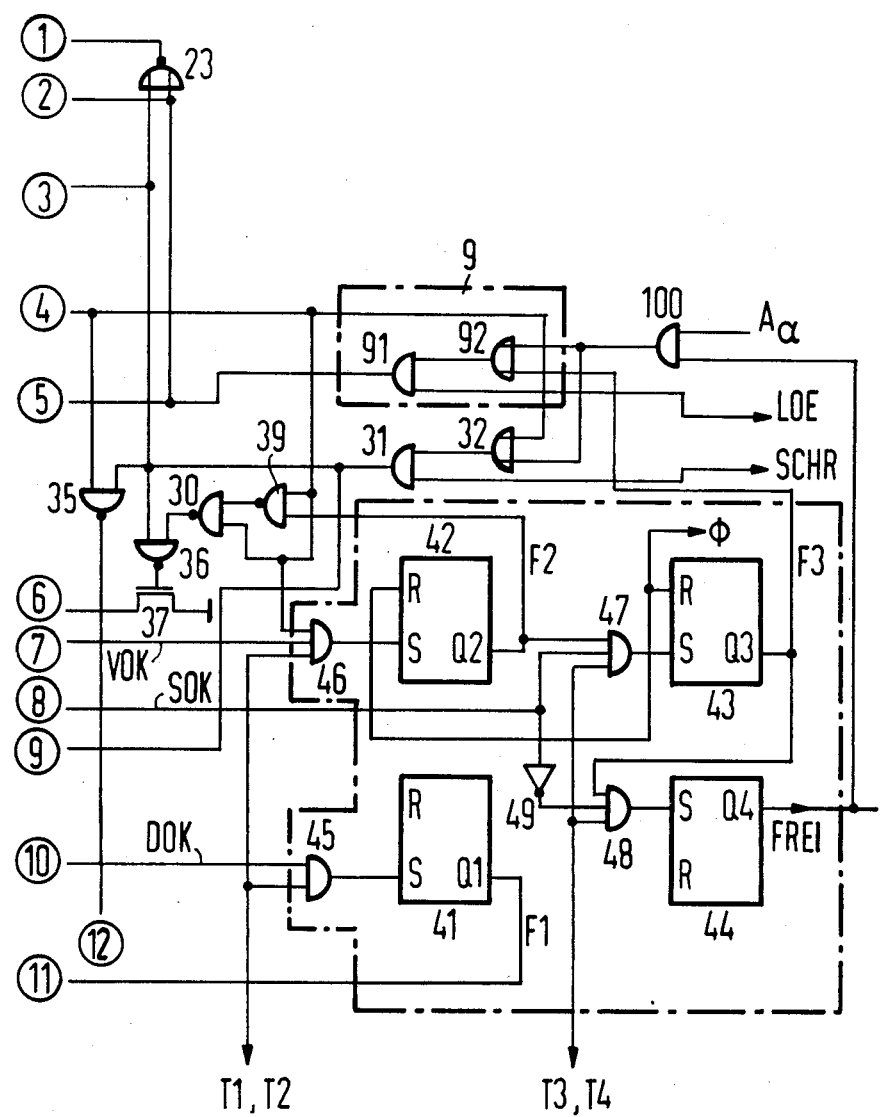

All line connections from the interface of FIG. 3 and FIG. 4 are marked by circled numerals 1 to 12 .

As FIG. 4 shows in conjunction with FIG. 3, the write control consists of the AND gate 31, the OR gate 32, the NAND gates 30, 35, 36, 39 and the MOSFETs 33, 37, 38 and 62. All column lines which are associated with the data input lines DER and DER' are connected via the controlled path of a load MOSFET 38 to a line leading to a write inhibitor. The common controlled path of each MOSFET 62, 64 is connected via the controlled path of the MOSFET 64 to the low reference potential (ground). The MOSFET 64 is addressed by the signal on the data output line DAR.

The write inhibitor consisting of the NAND gates 30, 36, 39 (FIG. 4) is operative in the case of selection of the operating data region via the address lines Aγ. It is cancelled only if a validation signal F2 is generated which is dependent on the second state change signal VOK. The write inhibition works via the NAND gate 36 and the MOSFETs 37 addressed thereby. Its control path connects the MOSFETs 38 (FIG. 3) at every column line via the common MOSFET 65 to the low reference potential (ground) if the write inhibitor is operative.

As long as the MOSFET 37 (FIG. 4) conducts, the maximum voltage on all columns is limited via the voltage divider which is determined by the MOSFETs 38, 62, 65 (FIG. 3), to a low voltage level of, for instance, 5 V which is insufficient for writing a storage cell, but does not interfere with the reading of the storage cells. Under these conditions, a write operation via the MOSFETs 62 is impossible.

If the second validation signal F2 occurs, a write signal SCHR is active and can cut off the MOSFET 37 if an address is applied to the address lines Aγ. Thus, the voltage at the column lines can increase via the load MOSFETs 66, to a value of, for instance, 20 V sufficient for writing if the MOSFET 64 is blocked via the logic value 0 on the data output line DAR, which represents a write request of the column line. For the duration of the write signal SCHR the MOSFET 62 conducts and thereby, the voltage on the column line also becomes dependent on the information stored in the data register 1". Via the entered control word in the data register 1", a write request is made at the same time, if the logic value 0 is present on the data output line DAR', leading to the first operating data region, and if in the second operating data region at least still one storage cell with the erase level logic 1 is juxtaposed on a corresponding data output line DAR with a logic level 0.

The data input lines DAR of the second operating data region into which writing is performed, depend on the MOSFETs 34' and 34, respectively. The selection of the memory cells takes place during writing via the row control 8 (FIG. 3), which connects the respective programming lines to the high reference potential via a MOSFET 93. If the first validation signal F1 is set, all MOSFETs 34 associated with the second operating data region are cut off during a write operation, so that the voltage on the column lines can assume the value required for writing. The column line belonging to the first operating data region, on the other hand, is connected by the MOSFET 34' to the low reference potential (ground) and therefore cannot be written on.

When the first validation signal F1 occurs, on the other hand, all MOSFETs 34 conduct and the MOSFET 34' is cut off. Thus, a write operation can be carried out only in the first operating data region. Writing in the user data region depends on the fourth validation signal FREI, as will be described in a later section in conjunction with the access protection.

The erase control unit 9 (FIG. 4) consists of the AND gate 91, the OR gate 92 in cooperation with the MOSFET 93 (FIG. 3). It comprises an erase inhibitor which consists of the OR gate 92 and acts on the operating data memory. This inhibition is cancelled by a third validation signal F3 which depends on the two-state change signals VOK, SOK. In that case, the controlled paths of the two MOSFETs connect the programming lines of the operating data memory to the high reference potential required for the erase process.

Like a write operation, also an erase operation with respect to the user data memory can be carried out only if the fourth validation signal FREI occurs.

The read control 2 consists of the NOR gate 23 and the MOSFETs 20 serving as a read block. The controlled path of the MOSFET 24 connects via the row control 8 all programming lines to a read voltage $U_{LES}$. Since the NOR gate 23 is connected on the input side to the outputs of the write and erase control 3, 9, the column lines are subjected only to a read voltage if neither a write signal SCHR nor an erase signal LOE is in effect.

The controlled paths of the MOSFETs 20 are in the data input lines DER, DER' ahead of the data register 1". Their control inputs are connected to the address lines Aβ of the code data memory via an inverter 22 and an AND gate 21. As long as the code data memory is being addressed, the data input lines DER, DER' are blocked. Because of the AND gate 21, data can be transferred from the memory 7 into the data register 1" only if the code data memory is not addressed and if a setting signal $\phi_S$ is applied.

The row control 8 consists of the MOSFETs 81, 182 and, in connection with the erase control, of the MOSFET 83. The controlled paths of the MOSFET's 81, 82 are connected to the output of the programming lines of the user data region or the code data region, respectively. They can be addressed via the addressing lines Aα and Aβ, respectively. They are connected via a common junction point to the controlled paths of the MOSFETs 24, 93 and 33. Depending on the effectiveness of a read, an erase or a write signal, they connect the programming lines to the read voltage $U_{LES}$, the high reference potential or the low reference potential (ground), respectively.

The cycle control 4 consists of a first, second, third and fourth flip-flop 41, 42, 43, 44 and a first, second, third, fourth AND gate 45, 46, 47, 48 connected to the control inputs of the flip-flops. It serves for addressing the erase, write and read control 9,3,2, under control of the comparison signal DOK and the two state change signals VOK and SOK, respectively. The cycle control generates the first, second and third validation signal F1, F2, F3 and a fourth validation signal FREI.

Because of the AND gates 45, 46, the flip-flops 41, 42 can be set only if first clock pulses T1, T2 are present. Likewise, the other flip-flops 43, 44 can be addressed by signals only if further clock signals T3 or T4 occur via the AND gates 47, 48, respectively. These clock signals serve only for the synchronization of the cycle control.

The flip-flop 41 is set via the AND gate 45 by the comparison signal DOK. In this case, the first validation signal F1 can be taken from the output Q1. The second flip-flop 42 is set when the first state change signal VOK occurs and the address of the operating data region is applied. The second validation signal F2 is present at its output Q2. Depending thereon and on the occurrence of the second state change signal SOK, the third flip-flop 41 is set via the AND gate 47. The output signal thereof at the output Q3 represents the third validation signal F3. Like the second flip-flop 42, it is reset via the shift clock pulse $\phi$. It is thereby assured that every data change in the shift register 1" necessitates a repetition of the control processes.

The appearance of the third validation signal F3 is the condition for setting the fourth flip-flop 44 and for delivering the fourth release signal FREI at the output Q4. The fourth flip-flop 44 can furthermore be set only if the first state change signal SOK is not generated. This condition is forced by means of an inverter 49, to which the first state change signal SOK is fed and which is connected to the inverter 49 on the input side.

The fourth release signal FREI controls an access protection device, by which the access to the user memory can be controlled, depending on the application. In the example described, it consists of the AND gate 100, to which the fourth validation signal FREI is applied on the input side and, via the address line Aα, the address of the user memory.

The output of the AND gate 100 is connected via OR gates 32, 92 to the AND gates 31 and 91, respectively, at which the write signal SCHR or the erase signal LOE is present. The access protection thereby prevents the write signal SCHR and the erase signal LOE from becoming effective with respect to the user data memory, if the validation operation is not completed successfully with the generation of the fourth validation signal FREI.

In the following, the operation of the control unit will be described with the aid of three possible cases of use, namely cases A, B, C. In the first case A it is assumed that the user or a computer program enters one or more code words correctly and in the prescribed order. After the comparison operation in the comparator 57 is completed, the comparison signal DOK is passed to the cycle control 4. Subsequently, the control word made available by a computer is compared with the erased memory content of the two operating data regions. Under the conditions assumed above, this comparison causes the second state change signal VOX to be delivered which cancels the writing inhibition of the write control or "erase control" 3 via the cycle control 4. In the subsequent writing operation, the first operating data region (validation region) is written under the control of the reference signal DOK. The change of this memory content is ascertained by the first state change indicator 59 and is reported to the cycle control 4 by the delivery of the first state change signal SOK. The occurrence of this signal is the condition for the delivery of the fourth validation signal FREI. In addition, it cancels the erase inhibition acting on the two operating data regions, so that they can be erased in a subsequent erase operation.

In case B, an authorized user enters erroneously an incorrect code word before he notices his error and corrects the wrong entry. Thus, the comparison signal DOK is not generated, so that writing on the first code region does not take place in the write operation following the control word comparison. Instead, the storage locations of the second operating data region selected by the logic value zero on the data input signals DAR are written-on. As a result, the second state change signal VOK is not generated. This "unsuccessful attempt" remains stored in the second operating data range, since the erase blocking is operative. As long as the former is not written full, the entry of a code word can be repeated.

In case C, the almost unlimited selection of code words provides an extremely low probability that within the given number of "unsuccessful attempts" the accidentally correct code word is entered. After the limited second operating data region is completely written over by unsuccessful attempts, neither write nor erase operations can be carried out. Therefore, the fourth release signal FREI is not generated. Since this condition cannot be reversed, all access to the memory 7 is irreversibly prevented.

The foregoing is a description corresponding in substance to German Application No. P 33 18 101.2, filed May 18, 1983, the International priority of which is claimed for the instant application, and which is hereby made part of this application. Any material discrepancies between the foregoing specification and the aforementioned corresponding German application are to be resolved in favor of the latter.

I claim:

1. Monolithically integrable circuit arrangement consisting of a memory with non-volatile electrically writable and erasable memory cells, an addressing circuit for reading, writing and erasing memory, and of a control unit which makes the access to the memory dependent on a validation operation with data comparison between stored reference data and code data entered from the outside, wherein the control unit, consisting of at least one comparator (57) for delivering a comparison signal (DOK), of a write control unit (3) for alternatively writing on a first or second operating data region which can be selected via an addressing unit depending on the comparison signal in such a manner that in the event of equality of the data, the first, and in the event of inequality of the data, the second operating data region is addressed, and having an erase control unit (9) for erasing the operating data regions, depending on the preceding execution of a write operation in the first operating data region.

2. Circuit arrangement according to claim 1, comprising at least one state change indicator (59) associated with the first operating data region for delivering a first state change signal (SOK) in the event of a change of the memory content of the first operating data region.

3. Circuit arrangement according to claim 1, wherein at least one second state change indicator (58) associated with the second operating data region, for delivering a second state change signal (VOK) if a free storage cell of the second operating region is addressed.

4. Circuit arrangement according to claim 3, comprising: several storage cells in the second operating data region; several second state change indicators (58) which are respectively assigned to the storage cells, and the outputs of which are interlinked with each other via a logical OR circuit.

5. Circuit arrangement according to claim 1, characterized by the feature that the write control (3) comprises a write inhibitor depending on the output signal of the second state change indicator (58), for the two operating data regions.

6. Circuit arrangement according to claim 1, comprising an erase control for the common erasing of the first and the second operating data region.

7. Circuit arrangement according to claim 1, characterized by the feature that the erase control comprises an erase inhibitor which depends on the output signal of the first state change indicator (59) for the two operating data regions.

8. Circuit arrangement according to claim 1, further comprising a cycle control (4) for validating the write inhibition after the occurrence of the second state change signal (VOK).

9. Circuit arrangement according to claim 8, wherein said cycle control further operates to validate an erase inhibitor after the occurrence of the first state change signal (SOK).

10. Circuit arrangement according to claim 8, wherein the cycle control further operates to produce a fourth validation signal (FREI) after the occurrence of the first state change signal (SOK).

11. Circuit arrangement according to claim 1, further comprising a shift register (1) for receiving a code word, which can be read by means of a shifting clock frequency $\phi$ and a device for resetting the cycle control into a defined starting state in response to the shifting clock frequency $\phi$.

* * * * *